(12) United States Patent
Babcock

(10) Patent No.: US 7,739,921 B1
(45) Date of Patent: Jun. 22, 2010

(54) PARAMETER MEASUREMENT/CONTROL FOR FLUID DISTRIBUTION SYSTEMS

(75) Inventor: Wade Babcock, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/900,133

(22) Filed: Aug. 21, 2007

(51) Int. Cl.
*G01F 1/22* (2006.01)

(52) U.S. Cl. ................. 73/861.57; 73/252; 169/16; 285/62

(58) Field of Classification Search .......... None
See application file for complete search history.

(56) References Cited

U.S. PATENT DOCUMENTS

| | | | |
|---|---|---|---|
| 3,786,869 A | 1/1974 | McLoughlin | |
| 3,974,879 A | 8/1976 | Nelson, Jr. et al. | |
| 5,495,769 A | 3/1996 | Broden et al. | |
| 5,608,171 A * | 3/1997 | Hunter et al. | 73/861.63 |
| 5,708,195 A | 1/1998 | Kurisu et al. | |
| 5,721,383 A * | 2/1998 | Franklin et al. | 73/861.77 |
| 5,921,266 A | 7/1999 | Meyer | |
| 5,927,342 A | 7/1999 | Bogut et al. | |
| 5,967,176 A * | 10/1999 | Blann et al. | 137/489.5 |
| 6,085,586 A * | 7/2000 | Arvidson et al. | 73/201 |
| 6,381,549 B1 * | 4/2002 | Smith | 73/861.28 |
| 6,536,271 B1 * | 3/2003 | Gopalakrishnan et al. | 73/168 |
| 6,609,431 B1 * | 8/2003 | Tietsworth et al. | 73/861.52 |
| 6,626,042 B2 | 9/2003 | Havlena | |
| 6,769,299 B2 | 8/2004 | Forster et al. | |
| 6,885,920 B2 * | 4/2005 | Yakes et al. | 701/22 |
| 6,983,889 B2 * | 1/2006 | Alles | 236/49.1 |
| 6,997,390 B2 * | 2/2006 | Alles | 236/49.4 |
| 7,059,200 B2 * | 6/2006 | Sallee | 73/861.88 |
| 7,073,394 B2 * | 7/2006 | Foster | 73/861.22 |
| 7,290,450 B2 * | 11/2007 | Brown et al. | 73/861.23 |
| 2002/0002425 A1 * | 1/2002 | Dossey et al. | 700/284 |
| 2004/0129092 A1 | 7/2004 | Dietzel | |
| 2005/0217389 A1 * | 10/2005 | Foster | 73/861.22 |
| 2008/0163700 A1 * | 7/2008 | Huang | 73/861.25 |
| 2009/0035121 A1 * | 2/2009 | Watson et al. | 415/1 |

OTHER PUBLICATIONS

Industrial Measurement and Control. J. Webster (ed.), Wiley Encyclopedia of Electrical and Electronics Engineering. Copyright 2007. pp. 1-24.*

* cited by examiner

*Primary Examiner*—Harshad Patel
(74) *Attorney, Agent, or Firm*—Fredric J. Zimmerman

(57) ABSTRACT

A flow measurement system uses conduits adapted to be coupled to and throughout a liquid or gaseous fluid flow distribution system. Each conduit is instrumented to measure parameters associated with the liquid or gaseous fluid moving therethrough, and wireless transmit a unique code and data indicative of the parameters so-measured. A remotely-located receiver and output device(s) may be used to provide the data and unique code associated with each of the conduits in a human-discernable format. Each conduit may also receive data resulting in adjustment of fluid flow through the conduit.

18 Claims, 1 Drawing Sheet

PARAMETER MEASUREMENT/CONTROL FOR FLUID DISTRIBUTION SYSTEMS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD OF THE INVENTION

The invention relates generally to fluid distribution systems, and more particularly to a system that measures parameters associated with the flow of water in various parts of a fire-fighting water distribution system in order to aid in the control thereof.

BACKGROUND OF THE INVENTION

Firefighters assemble temporary water distribution systems which can deliver water from street-level supply lines to individual firefighters. These systems hook into standpipes supplied with pressurized water by a local infrastructure. The water pressure is increased through the use of pumps (e.g., "pumper trucks") as the water is delivered using lengths of supply lines and valves to take water where needed. The pressure and velocity of the water in these temporary systems is often unknown. This situation can create problems for firefighters in "hot zones" as they wait for a pressurized volume of water to reach their end of a supply line. Further, when one supply source is used to feed a number of lines/nozzle terminations, changes in demand at one nozzle termination can negatively impact the amount of water being delivered to other nozzle terminations coupled to the same supply source.

SUMMARY OF THE INVENTION

Accordingly, it is an object of the present invention to provide a system for measuring parameters associated with the flow of a fluid through a fluid distribution system.

Another object of the present invention is to provide a system for measuring parameters associated with the flow of water through a fire-fighting distribution system.

Still another object of the present invention is to provide a system that can be used to monitor and/or adjust the flow of water moving through a fire-fighting distribution system.

Other objects and advantages of the present invention will become more obvious hereinafter in the specification and drawings.

In accordance with the present invention, a flow measurement system uses a plurality of conduits adapted to be coupled to and throughout a fluid distribution system such as that used in fire-fighting applications. Each conduit is instrumented to (i) measure parameters associated with fluid moving therethrough, and (ii) wirelessly transmit a unique code and data indicative of the parameters so-measured. The flow measurement system further includes a receiver located remotely with respect to the conduits for receiving each unique code and data transmitted from the conduits. The data so-received from each of the conduits is output in a human-discernable format (e.g, visual display, audio, etc.). If the conduits are equipped with an adjustable valve, the data can further be used in a control system to make adjustments to the valve to achieve a desired flow through each conduit.

BRIEF DESCRIPTION OF THE DRAWINGS

Other objects, features and advantages of the present invention will become apparent upon reference to the following description of the exemplary embodiments and to the drawings, where corresponding reference characters indicate corresponding parts throughout the several views of the drawings and wherein.

DETAILED DESCRIPTION OF THE INVENTION

Figure 1:
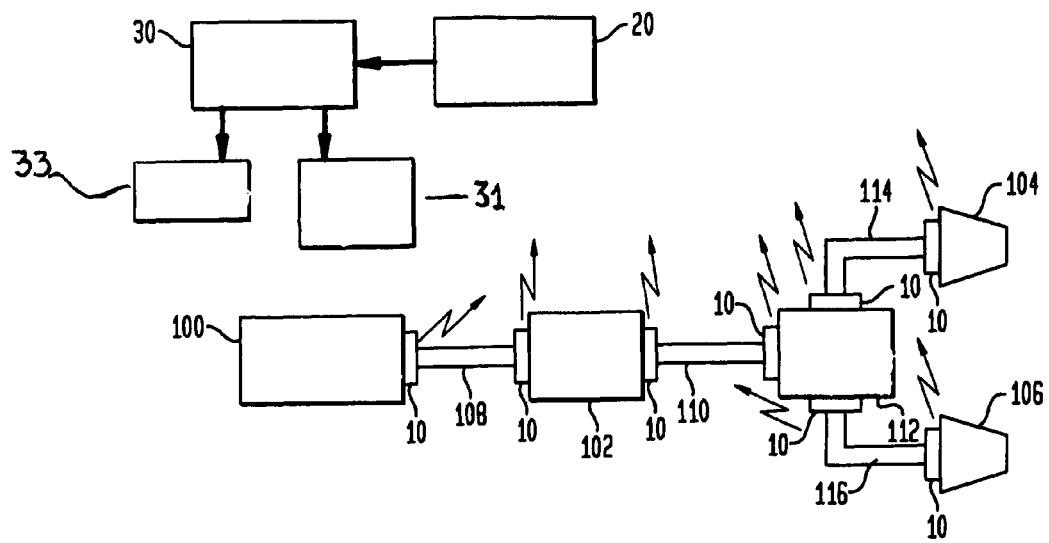
FIG. 1 is a schematic view of a fire-fighting distribution system outfitted with a system for measuring parameters associated with the water moving through the distribution system in accordance with an embodiment of the present invention.

Referring now to the drawings and more particularly to FIG. 1, a simple fire-fighting liquid fluid distribution system is illustrated schematically along with an embodiment of the present invention. It is to be understood that the illustrated fire-fighting liquid fluid/water distribution system is merely one example of a liquid fluid distribution system that can utilize the present invention. That is, the present invention can be adapted for use with a variety of liquid or gaseous fluid distribution systems. Therefore, it is to be understood that the present invention is not limited by or to use with a fire-fighting water distribution system, and may be used in other liquid fluid flow systems or a gaseous fluid flow system.

In general, fire-fighting fluid distribution systems include one or more standpipes (e.g., fire hydrants) from which a supply of pressurized water is available, one or more pumps (e.g., pumper trucks) used to increase the pressure of the fluid from the standpipe(s), one or more nozzles used to spray the pressurized water, and hoses/couplings used to link the standpipes(s), pump(s) and nozzle(s). For simplicity, the illustrated exemplary embodiment depicts a single standpipe 100, a single pump 102, and two nozzles 104 and 106. Standpipe 100 is linked to pump 102 by a hose 108. In an exemplary embodiment, pump 102 is linked to nozzles 104 and 106 by a hose 110, a "Y" coupling 112, and hoses 114 and 116 leading from coupling 112 to nozzles 104 and 106, respectively. In other exemplary embodiments, the configuration may be different and the coupling 112 may have a different shape, for example, a single output connecting to a single hose, such as, hose 114 or 116, which connects to a single nozzle, such as, nozzle 104 or 106.

In accordance with the present invention, a number of instrumented, waterproof conduits 10 are mounted in line with the various hoses of the fluid distribution system. For example, as will be explained further below, each of the instrumented conduits 10 can be figured as a coupling that provides for the connection of the end of a hose to another part of the fluid distribution system. In an exemplary embodiment, the instrumented, waterproof conduit 10 may be substantially adjacent to a component, for example, the single standpipe 100, the pump 102 and/or the "Y" coupling 112 of the water distribution system in order to monitor and/or regulate specific flow parameters at a location as needed. Accordingly, in an exemplary embodiment, at least one instrumented conduit 10 may be intermediate different components of the fluid distribution system, for example, intermediate the standpipe 100 and the pump 102, intermediate the pump 102 and the coupling 112, and intermediate the coupling 112 and the nozzles 104, 106. In another exemplary embodiment, the instrumented conduit may be located "mid-pipe" by joining the ends of two standpipes 100 together for obtaining specific desired information at this location or potentially regulating the flow. Accordingly, in general, each of the instrumented conduits 10 is capable of measuring one or more parameters associated with the flow of fluid moving therethrough. The measured parameters may be wirelessly transmitted for receipt by a remotely-located receiver 20 (e.g., onboard a fire truck). Each of the instrumented conduits 10 also may be equipped to transmit, wirelessly, a unique identification code so that the measured parameters can be associated with the particular instrumented conduit 10. In the simplest embodiment of the present invention, the measured parameters received at receiver 20 are provided to one or more output device(s) 30 that make the data available in one or more human discernable formats (e.g., a visual display 31 and/or audio formats 33). The collected data can be used as an educational tool or, more practically, as an indication that a fluid supply problem exists that needs to be addressed.

Figure 2:
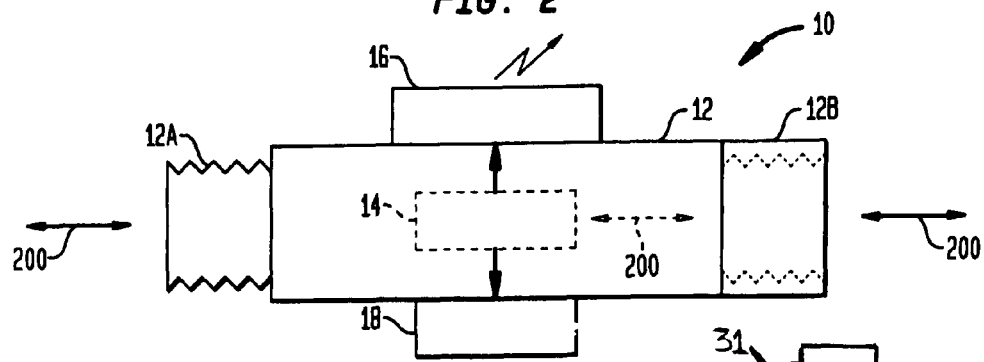
FIG. 2 is a schematic view of a coupling in accordance with an embodiment of the present invention used to measure and transmit parameters associated with water moving therethrough.

As mentioned above, each of the instrumented conduits 10 is moveable and can be configured as a coupling so that the inventive system is modular or adaptable to the needed configuration of the equipment, for example, as depicted in FIG. 1, and the need to place the instrumented conduits 10 at specific locations in the system. Accordingly, FIG. 2 illustrates an exemplary embodiment of the instrumented conduit 10 that includes a housing 12 that terminates at one end thereof in a male connector 12A (e.g., threaded insert) and at the other end thereof 12B in a female connector (e.g., internally-threaded sleeve). However, it is to be understood that the ends of housing 12 can be equipped with any of a variety of connector constructions without departing from the scope of the present invention.

Conduit 10 supports a flow of water therethrough in either direction as indicated by two-headed arrows 200. Mounted within housing 12 is at least one measuring device 14 and, in an exemplary embodiment, the measuring device(s) 14 is at least one sensor 14 exposed to flow 200. Sensor(s) 14 measure the parameters (associated with flow 200) that will be wirelessly transmitted from conduit 10. For fire-fighting scenarios, sensor(s) 14 should be capable of measuring pressure and flow rate. While the present invention is not limited by the particular type of measuring device or sensor(s) 14, in an exemplary embodiment, a suitable sensor type is a MEMS-based flow rate sensor, which functions, in part, based on differential pressure. Accordingly, a single sensor could be used to provide both pressure and flow rate. If two of these sensors 14 are used, flow direction can also be determined.

The measured parameters are provided to a wireless transceiver component 16, which may be mounted on conduit 10. Generally, the transceiver component 16 is a transceiver 16, which may be mounted on the exterior of housing 12. By way of an exemplary embodiment, the wireless transceiver 16 may be a "radio frequency identification" (RFID) transceiver 16. Such devices can be configured to transmit an identifying code along with the data supplied thereto by sensor(s) 14. The transceiver 16 may also be configured to receive information as indicated below. In an exemplary embodiment, the wireless transceiver component 16 may be a transmitter.

Each instrumented conduit 10 may also include a memory component 18 and, in an exemplary embodiment, an onboard memory 18 that stores the parameters measured by sensor(s) 14. For example, data can be stored on a periodic basis. The stored data can be archived for later analysis, or could be made available on demand (e.g., via a "plug in" connection) for immediate field analysis.

Figure 3:
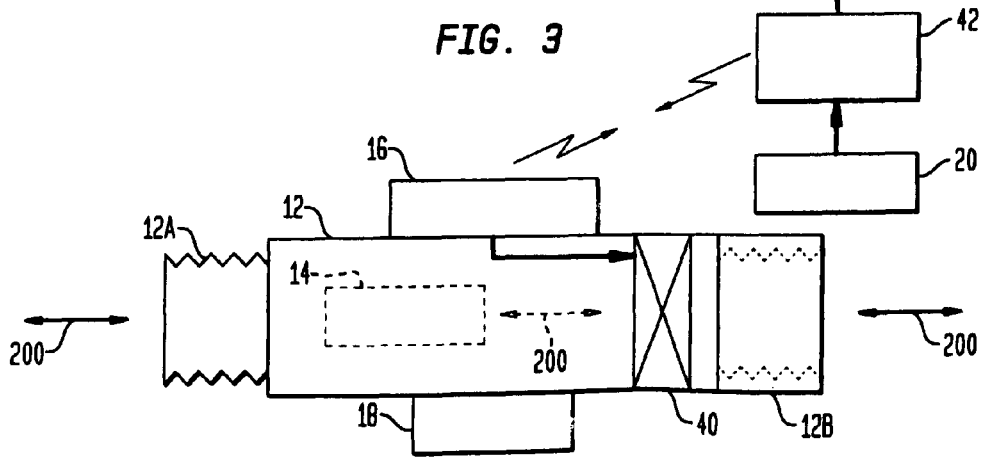
FIG. 3 is a schematic view of another embodiment of a coupling further outfitted to adjust the flow of water moving therethrough in accordance with control signals received from a remotely-located controller.

The present invention may be further adapted to form part of a flow control system that provides for adjustments to the flow of water moving though an instrumented conduit. For example, as shown in FIG. 3, housing 12 incorporates a valve 40 also referred to as a "valve component" 40, which, in an exemplary embodiment, is an adjustable valve 40 that can be opened/closed to change the flow rate of flow 200. In other exemplary embodiments, for example, the valve 40 may be a non-adjustable valve. Further, a remotely-located controller 42 receives information from the receiver 20 and transmits wireless control signals for receipt by RFID transceiver 16. The control signals govern the position of the valve 40 to provide a desired pressure and flow rate. Sensor(s) 14 monitor the flow parameters as previously described and RFID transceiver 16 transmits the measured parameters to receiver 20. The measured parameters are provided to controller 42 where a control routine determines if any adjustments to valve 40 are required to achieve the desired pressure and flow rate. As shown in FIG. 3, a visual display 31 may be coupled to the controller 42 for displaying data from each of the plurality of couplings 10 received by the controller 42. If so, the adjustments are wirelessly transmitted from the controller 42 via the RFID transceiver to the valve 40.

Although the invention has been described relative to specific exemplary embodiments, there are numerous variations and modifications that will be apparent to those skilled in the art. It is therefore understood that, within the scope of the appended claims, the invention may be practiced other than as specifically described.

Finally, any numerical parameters set forth in the specification and attached claims are approximations (for example, the term "about") that may vary depending upon the desired properties sought. At the least, and not to attempt limiting the application of the doctrine of equivalents to the scope of the claims, each numerical parameter should at least be construed in light of the number of significant digits and by applying ordinary rounding.

What is claimed is:

1. A flow measurement system, comprising:
    a plurality of conduits being adapted for coupling to and throughout a fluid distribution system,
        wherein each of said plurality of conduits is instrumented with a measuring device to measure parameters associated with fluid moving therethrough, and a wireless transceiver component coupled to said measuring device to transmit a unique code and data indicative of said parameters so-measured,
        wherein said wireless transceiver component is mounted on said each of said plurality of conduits and said measuring device is mounted within said each of said plurality of conduits, and
        wherein said wireless transceiver component and said measuring device are situated adjacent said each of said plurality of conduits;
    a receiver located remotely with respect to said plurality of conduits for receiving said unique code and said data transmitted therefrom; and
    an output device coupled to said receiver for outputting said data from each of said plurality of conduits in a human-discernable format.

2. The flow measurement system as in claim 1, wherein each of said plurality of conduits comprises a first end terminating in a female-type connector and a second end terminating in a male-type connector.

3. The flow measurement system as in claim 1, wherein said measuring device comprises at least one sensor for measuring pressure and flow rate of the fluid moving therethrough.

4. The flow measurement system as in claim 1, wherein each of said plurality of conduits is further instrumented with a memory component for storing said parameters so-measured.

5. The flow measurement system as in claim 1, wherein said wireless transceiver component comprises a radio frequency identification (RFID) transmitter.

6. The flow measurement system as in claim 1, further comprising a valve component mounted within each of said plurality of conduits where adjustment of said valve component affects said parameters.

7. The flow measurement system as in claim 6, wherein each said valve component is a remotely controlled valve component.

8. A flow measurement system for use in fire-fighting, comprising:
    a plurality of couplings supporting flow therethrough between a first end thereof being defined by a male connector and a second end thereof being defined by a female connector,
        wherein said plurality of couplings are adapted to be coupled to and throughout a fire-fighting fluid distribution system, which includes at least one standpipe, at least one pump, at least one nozzle, and a plurality of hoses, which couple said standpipe, said pump and said nozzle,
        wherein each of said plurality of couplings is instrumented with a measurement device to measure at least pressure and flow rate of fluid moving therethrough, and a wireless transceiving component coupled to said measuring device for transmitting a unique code and data indicative of said pressure and said flow rate so-measured,
        wherein said wireless transceiving component is mounted on said each of said plurality of couplings and said measuring device is mounted within said each of said plurality of couplings, and
        wherein said wireless transceiving component and measuring device are situated adjacent said each of said plurality of couplings;
    a controller being located remotely with respect to said plurality of couplings for communicating with each said wireless transceiving component; and
    a display being coupled to said controller for displaying said data from each of said plurality of couplings received by said controller.

9. The flow measurement system as in claim 8, wherein said measuring device for measuring said pressure and said flow rate comprises at least one sensor mounted on an inside surface of each of said plurality of couplings.

10. The flow measurement system as in claim 8, wherein said each of said plurality of couplings is further instrumented with a memory component for periodically storing said pressure and said flow rate so-measured.

11. The flow measurement system as in claim 8, wherein said wireless transceiving component comprises a radio frequency identification (RFID) transceiver.

12. The flow measurement system as in claim 8, further comprising a valve component mounted within each of said plurality of couplings where adjustment of said valve component affects said pressure and said flow rate.

13. The flow measurement system as in claim 12, wherein each of said valve component is remotely controlled by instructions issued through said transceiver.

14. A flow measurement system for use in fire-fighting, comprising:
    a plurality of conduits being adapted for coupling to and throughout a fife-fighting water distribution system, which includes at least one standpipe, at least one pump, at least one nozzle, and a plurality of hoses coupling said standpipe, said pump and said nozzle,
        wherein each of said plurality of conduits is instrumented with a measuring device for measuring at least pressure and flow rate of water moving therethrough, a radio frequency identification (RFID) transceiver coupled to said measuring component for transmitting a unique code and data indicative of said pressure and said flow rate so-measured, and a memory component used for storing said pressure and said flow rate so-measured,
        wherein said RFID transceiver is mounted on said each of said plurality of conduits and said measuring device is mounted within said each of said plurality of conduits, and
        wherein said RFID transceiver and said measuring device are situated adjacent said each of said plurality of conduits;
    a receiver being located remotely with respect to said plurality of conduits for receiving said unique code and said data transmitted therefrom; and
    a display being coupled to said receiver for outputting a visual representation of said data from each of said plurality of conduits.

15. The flow measurement system as in claim 14, wherein each of said plurality of conduits comprises a first end terminating in a female-type connector and a second end terminating in a male-type connector.

16. The flow measurement system as in claim 14, wherein said measurement component for measuring said pressure and said flow rate comprises at least one sensor mounted on an inside surface of each of said plurality of conduits.

17. The flow measurement system as in claim 14, further comprising a valve component mounted within each of said plurality of conduits where adjustment of said valve component affects said pressure and said flow rate.

18. The flow measurement system as in claim 17, wherein said valve component is coupled to said RFID transceiver, and
    wherein said valve component is remotely controlled by control signals received by said RFID transceiver.

* * * * *